United States Patent Office 3,497,498
Patented Feb. 24, 1970

---

3,497,498
6,6-ETHYLENETESTOSTERONES
Vlasios Georgian, Belmont, Mass., assignor to Trustees of Tufts College, Medford, Mass., a corporation of Massachusetts
No Drawing. Continuation-in-part of application Ser. No. 366,604, May 11, 1964. This application Sept. 1, 1965, Ser. No. 484,458
Int. Cl. C07c *169/22, 167/00, 17/06*
U.S. Cl. 260—239.55      5 Claims This application is a continuation-in-part of application Ser. No. 366,604 filed May 11, 1964, now abandoned.

This invention relates to novel testosterone derivatives and more specifically to 6,6-ethylenetestosterones. These compounds have anabolic-androgenic activity.

The compounds of this invention may be represented by the following general structural formula:

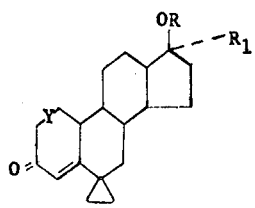

FORMULA I in which:
Y represents a single or double bond;
R represents hydrogen, cyclopenten-1-yl, cyclohexen-1-yl, (1'-ethoxy)-cyclopentyl, (1'-ethoxy)-cyclohexyl, 2'-terahydropyranyl or an acyl group of from 2 to 10 carbon atoms; and
$R_1$ represents hydrogen, methyl, ethyl, vinyl, ethynyl, chloroethynyl, bromoethynyl, 2-propynyl or 1,1,1-trifluoro-2-propynyl.

Preferred compounds are those represented by Formula I in which R is hydrogen and $R_1$ is hydrogen or methyl. Exemplary of preferred acyl groups are those derived from a lower aliphatic carboxylic acid such as acetyl or propionyl, or from a substituted lower aliphatic carboxylic acid such as cyclopentylpropionyl, phenylpropionyl or p-chlorophenoxyacetyl.

The novel testosterone derivatives of this invention generally are prepared as illustrated by the following reaction sequence:

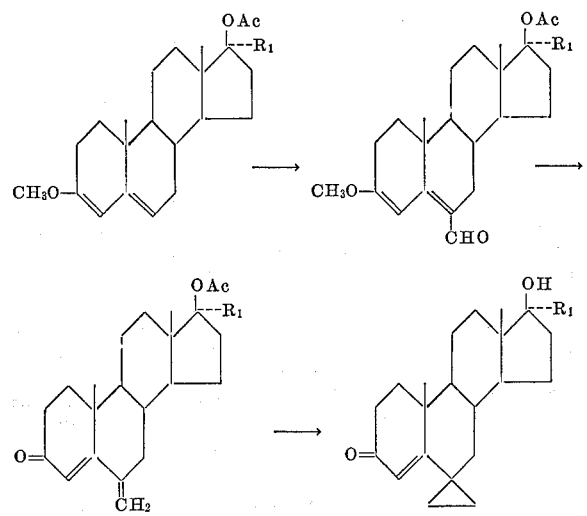

Thus, as shown above the methyl enol ether of the appropriately substituted testosterone acetate is treated with the Vilsmeir reagent (phosgene and dimethylformamide) to give the corresponding 6-aldehyde derivative which in turn is reduced with, for example, sodium borohydride to the 6-hydroxymethyl compound. Dehydration of this intermediate with for example glacial acetic acid gives the 6-methylenetestosterone acetate. The later is reacted with a reagent formed from trimethylsulfoxonium iodide. This iodide in the presence of a strong base such as sodium hydride forms a reactive substance called dimethylsulfoxonium methylide,

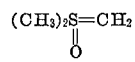

which produces the 6,6-ethylenetestosterone derivative. The acetyl group is optionally removed by hydrolysis with, for example, an alkali metal hydroxide such as sodium or preferably potassium hydroxide.

The 17α-vinyl derivatives of Formula I are advantageously prepared from the corresponding 6,6-ethylene-17α-ethynyltestosterones by hydrogenation with preferably Lindlar's catalyst comprised of palladium and barium sulfate plus lead. Reduction of the 17α-ethynyl group with palladium-charcoal in dioxane until 2 moles of hydrogen are absorbed gives the corresponding 6,6-ethylene-17α-ethyltestosterones.

The compounds of Formula I wherein Y is a double bond are advantageously prepared by oxidation of the 6,6-ethylenetestosterones with preferably dichloro-dicyanoquinone.

The cycloalkyl and cycloalkenyl ether derivatives of Formula I are advantageously prepared from the 6,6-ethylenetestosterones by reaction with a mixture of the diethyl acetal and enolic ether of cyclopentanone.

The tetrahydropyranyl ethers of Formula I are advantageously prepared from the corresponding tetrahydropyranyl ethers of 6-methylenetestosterones as described above. The ether starting materials are prepared by reaction of the 6-methyenetestosterone with dihydropyran in benzene solution employing preferably p-toluenesulfonic acid as an acid catalyst.

The compounds of Formula I where R is an acyl group are prepared by either employing the desired acyl derivative of a testosterone starting material, such as the acetic, or preferably by reacting the 6,6-ethylenetestosterone derivative with the desired acyl halide or anhydride in a tertiary amine such as pyridine.

The following examples illustrate the preparative procedures outlined about but are not intended to limit the scope of this invention.

EXAMPLE 1

A mixture of 6.6 g. of testosterone acetate, 10 ml. of dry dioxane, 10 ml. of methyl orthoformate and 50 mg. of p-toluenesulfonic acid monohydrate is stirred at room temperature for two and one-half hours. Methanolic potassium hydroxide solution is added to make the mixture basic. It is then filtered to give the solid methyl enol ether, M.P. 178–181° C.

To an ice-cold stirred solution of 18 ml. of dry, freshly distilled dimethylformamide in 65 ml. of ethylene chloride is added a solution of 12.5 g. of phosgene in 120 ml. of ethylene chloride, dropwise over two hours maintaining the temperature below 5° C. After 10 minutes 16.8 g. of the above enol ether in 150 ml. of ethylene chloride is gradually added. The mixture is stirred and allowed to warm up to room temperature over three hours. An aqueous methanolic solution of sodium acetate (25 g.) is added and the mixture is stirred vigorously for 10 minutes. The supernatant solution is decanted and remaining solid is washed with ether. The ether extract is washed with 10% sodium carbonate solution and then with water until neutral, dried and evaporated to give upon trituration with ether the 6-aldehydotestosterone acetate methyl enol ether, M.P. 159–162° C.

To a solution of 1 g. of the above 6-aldehyde in 50 ml. of methanol is added a solution of 200 mg. of sodium borohydride in 5 ml. of water, at room temperature. After 30 minutes the reaction mixture is acidified with acetic acid and the solvent is removed in vacuo to give an oil. The latter is treated with 10 ml. of glacial acetic acid and warmed on the steam bath for one hour. The acetic acid is removed in vacuo and the remaining solid is extracted with ether, washed with sodium bicarbonate solution and water. The dried extract is evaporated to give 6-methylenetestosterone acetate, M.P. 139–141° C.

To a solution of 610 mg. of dimethylsulfoxide methiodide in 5 ml. of dry dimethylsulfoxide is added 135 mg. of sodium hydride (51.8%) in three portions with stirring under nitrogen. After 10 minutes a solution of 855 mg. of the above 6-methylenetestosterone acetate in 10 ml. of dry dimethylsulfoxide is added gradually and the mixture allowed to stand at room temperature for 45 minutes. The mixture is then heated to 55° C. for one hour, poured into cold water and the separated solid is extracted with ether. The washed and dried extract is evaporated to give a residue which is purified by chromatography: first fraction, 6,6-ethylenetestosterone acetate, M.P. 147–150° C.; second fraction, 6,6-ethylenetestosterone, M.P. 222–224° C.

Hydrolysis of the above 6,6-ethylenetestosterone acetate with aqueous potassium hydroxide solution similarly yields 6,6-ethylenetestosterone.

EXAMPLE 2

A mixture of 5 g. of 17α-methyltestosterone and 40 ml. of acetic anhydride is refluxed for 30 minutes, the excess anhydride is removed in vacuo and the remaining material is treated with water and kept warm for one and one-half hours in order to decompose any residual anhydride. The separated crystalline material is filtered, washed and crystallized from methanol to give 17α-methyltestosterone acetate, M.P. 174–175° C.

A mixture of 14 g. of 17α-methyltestosterone acetate, 20 ml. of dry dioxane, 20 ml. of methyl orthoformate and 100 mg. of p-toluene sulfonic acid is stirred at room temperature for two and one-half hours. Workup of the reaction mixture yields 17α-methyltestosterone acetate methyl enol ether, M.P. 112–115° C.

Following the general procedures of Example 1, a mixture of 9 ml. of dimethylformamide in 32 ml. of ethylene chloride and 6.5 g. of phosgene in 60 ml. of ethylene chloride is reacted with 3 g. of the above enol ether in 75 ml. of ethylene chloride to give the 6-aldehydo-17α-methyltestosterone acetate methyl enol ether.

The 6-aldehyde thus obtained in 150 ml. of methanol is similarly reduced with 2 g. of sodium borohydride in 2 ml. of water and the resulting oil is dehydrated with 120 ml. of glacial acetic acid on the steam bath. The oil obtained thereby was purified by chromatography to give a crystalline solid, 6-methylene-17α-methyltestosterone acetate, M.P. 134–135° C.

The above 6-methylene acetate (1.8 g. of 25 ml. of dimethylsulfoxide) is similarly reacted with 1.25 g. of dimethylsulfoxide methiodide in 10 ml. of dimethylsulfoxide and 260 mg. of sodium hydride (51.8%) to give after workup and purification by chromatography the solid 6,6-ethylene-17α-methyltestosterone acetate, M.P. 164–165° C.

A mixture of 250 mg. of the above 6,6-ethylene acetate in 20 mg. of the above 6,6-ethylene acetate in 20 ml. of methanol and 250 mg. of potassium hydroxide in 2 ml. of water is refluxed for eight hours on the steam bath. The solvent is removed in vacuo and the resulting material is treated with water, followed by extraction with ether. The washed, dried extract is evaporated to give 6,6-ethylene-17α-methyltestosterone, M.P. 186–187° C.

EXAMPLE 3

A mixture of 10 g. of 17α-ethynyltestosterone, 150 ml. of dry pyridine and 70 ml. of acetic anhydride is heated at 100° C. for 48 hours. The reaction mixture is evaporated in vacuo, extracted with ether and the washed, dried extract evaporated to give 17α-ethynyltestosterone acetate, M.P. 166–167° C.

The enol ether is similarly prepared from 10.5 g. of 17α-ethynyltestosterone acetate, 15 ml. of dry dioxane, 15 ml. of methyl orthoformate and 50 mg. of p-toluenesulfonic acid monohydrate by stirring at room temperature for one hour. Solid 17α-ethynyltestosterone acetate methyl enol ether melts at 180–185° C.

Following the general procedure of Example 1, a mixture of 9 ml. of dry dimethylformamide in 32 ml. of ethylene chloride, 6.5 g. of phosgene in 60 ml. of ethylene chloride and 8.5 g. of the above enol ether in 75 ml. of ethylene chloride is reacted to give the 6-aldehydo-17α-ethynyltestosterone acetate methyl enol ether. The latter is dissolved in 150 ml. of methanol and similarly reduced with 2 g. of sodium borohydride in 2 ml. of water. The resulting oil is dehydrated with 100 ml. of glacial acetic acid on the steam bath for one hour. Workup yields 6-methylene-17α-ethynyltestosterone acetate, M.P. 164–165° C.

Similar reaction of a mixture 1.3 g. of dimethylsulfoxide methiodide in 10 ml. of dimethylsulfoxide and 260 mg. of sodium hydride (51.8%) with 1.8 g. of the above 6-methylene acetate in 20 ml. of dimethylsulfoxide yields upon workup a mixture of 6,6-ethylene-17α-ethynyltestosterone and its acetate which is hydrolyzed in aqueous-methanolic potassium hydroxide solution to give pure 6,6-ethylene-17α-ethynyltestosterone, M.P. 237–238° C.

EXAMPLE 4

A solution of 340 mg. of 6,6-ethylene-17α-ethynyltestosterone (prepared as in Example 3) in 100 ml. of ethanol is shaken with hydrogen and 100 mg. of Lindlar's catalyst (palladium and barium sulfate plus lead). After 15 minutes the required absorption of hydrogen is completed and the reaction mixture is filtered. The filtrate is evaporated to the point of crystallization, cooled and filtered to yield 6,6 - ethylene - 17α-vinyltestosterone, M.P. 206–208° C.

EXAMPLE 5

A mixture of 1.0 g. of 6,6-ethylene-17α-methyltestosterone (prepared as in Example 2), 0.8 g. of dichlorodicyanoquinone and 10 ml. of dioxane is refluxed with stirring for two hours. The reaction mixture is cooled, diluted with ether and the hydroquinone filtered and washed with ether. The filtrate is concentrated in vacuo to an oily solid which is dissolved in benzene and chromatographed to give 6,6-ethylene-17α-methyl-1,4-androstadiene-17-ol-3-one, M.P. 188–190° C.

Similarly, an equivalent amount of 6,6-ethylenetestosterone (prepared as in Example 1) is oxidized to 6,6-ethylene-1,4-androstadiene-17-ol-3-one, M.P. 174–175° C.

EXAMPLE 6

To a 10 ml. mixture of the diethyl acetal and enolic ether of cyclopentanone prepared as described in Belgian Patent No. 616,243 [Chem. Abs. 58, 12633 (1963)] is added 5.5 g. of 6,6-ethylenetestosterone prepared as in Example 1. The mixture is heated for 30 minutes at 145° C. then at 180–190° C. to give a residue which is taken up in methanol and recrystallized to give the cyclopenten-1-yl ether of 6,6-ethylenetestosterone.

Similar reaction with the diethylacetal of cyclohexanone yields the cylohexen-1-yl ether of 6,6-ethylenetestosterone.

EXAMPLE 7

A mixture of 8.6 g. of 6,6-ethylenetestosterone prepared as in Example 1 and 100 ml. of dry pyridine is cooled and treated with 16.9 g. of p-chlorophenoxyacetyl chloride. After 24 hours at room temperature the mixture is cooled to 0° C. treated with water, quenched in brine and then taken up in ethyl acetate. Evaporation gives 6,6-ethylenetestosterone 17-p-chlorophenoxyacetate.

Similarly following the above general directions, 8.6 g. of 6,6-ethylenetestosterone is reacted with 7.6 g. of propionyl chloride, 13.3 g. of cyclopentylpropionyl chloride or 13.9 g. of phenylpropionyl chloride to give, 6,6-ethylenetestosterone 17-propionate, 17-cyclopentylpropionate and 17-phenylpropionate, respectively.

EXAMPLE 8

Following the general directions outlined in Examples 1 and 3 and using equivalent amounts of reactants, 11.1 g. of 17α-chloroethynyltestosterone is converted to its ether acetate, reacted with phosgene dimethylformamide to give the 6-aldehyde, the latter reduced with sodium borohydride, and the resulting 6-methylene derivative treated with trimethylsulfoxonium iodide and sodium hydride to yield upon hydrolysis of the 17-acetate, the product 6,6-ethylene-17α-chloroethynyltestosterone.

Similarly by employing in the reaction sequences of Examples 1 and 3 equivalent amounts of 17α-bromoethynyltestosterone (12.5 g.), 17α-(2-propynyl)-testosterone (10.5 g.) or 17α-(1,1,1-trifluoro-2-propynyl)-testosterone (12.2 g.), there is obtained 6,6-ethylene-17α-bromoethynyltestosterone, 6,6-ethylene-17α-(2-propynyl)-testosterone and 6,6 - ethylene - 17α - (1,1,1-trifluoro-2-propynyl)-testosterone, respectively.

EXAMPLE 9

A solution of 500 mg. of 6,6-ethylene-17α-ethynyltestosterone (prepared as in Example 3) in 125 ml. of dioxane is shaken with hydrogen and 100 mg. of palladium-charcoal catalyst until 2 moles of hydrogen are absorbed. The reaction mixture is filtered and the filtrate evaporated to give 6,6-ethylene-17α-ethyltestosterone.

EXAMPLE 10

A suspension of 3.8 g. of 6-methylenetestosterone in 100 ml. of dry benzene is treated with 50 mg. of p-toluenesulfonic acid hydrate and 3.0 ml. of dihydropyran and the suspension stirred at room temperature for about one hour. The benzene solution is washed with 5% sodium bicarbonate solution and water. After drying, the solvent is evaporated to a syrup which crystallizes on standing. Crystallization from methanol (containing a little pyridine) gives 6 - methylenetestosterone - 17-(2'-tetrahydropyranyl)-ether, M.P. 160–162° C.

To a suspension of 2.2 g. of dimethylsulfoxonium methiodide in 30 ml. of dry dimethylsulfoxide is added 0.43 g. of a dispersion of sodium hydride in mineral oil (55.6%). After one-half hour the nearly colorless solution is treated all at once with a suspension of 3.1 g. of 6-methylenetestosterone-17-(2'-tetrahydropyranyl)-ether in 100 ml. of dimethylsulfoxide. The clear, orange solution is stirred at room temperature for one hour, then at 55–60° C. for one hour and poured into 1 l. of ice-cold brine. The product is extracted into 2:1 benzene:ether and the organic extracts thoroughly washed with salty water. After drying and evaporation of the solvents there is obtained an oily solid. Chromatography over 100 g. of alumina, eluting with benzene, gives 6,6-ethylenetestosterone-17-(2'-tetrahydropyranyl)-ether, melting at 128–130° C. after crystallization from methanol (with pyridine).

EXAMPLE 11

A solution of 5.5 g. of 6,6-ethylenetestosterone and 10 ml. of cyclopentanone diethylacetal in 50 ml. of chloroform containing 25 mg. of p-toluenesulfonic acid is heated for 30 minutes. The reaction mixture is washed with 5% sodium bicarbonate solution and water, dried and evaporated. The residue is taken up in methanol and recrystallized to give the 17-(1'-ethoxy)-cyclopentyl ether of 6,6-ethylenetestosterone.

Similarly, reaction with cyclohexanone diethylacetal yields the 17-(1'-ethoxy)-cyclohexyl ether of 6,6-ethylenetestosterone.

What is claimed is:
1. A chemical compound of the formula:

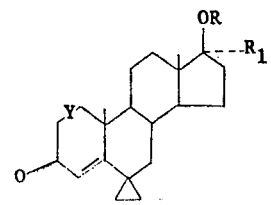

wherein:
  Y is a member selected from the group consisting of a 1,2-single bond and a 1,2-double bond;
  R is a member selected from the group consisting of cyclopenten-1-yl, cyclohexen-1-yl, (1'-ethoxy)-cyclopentyl, (1'-ethoxy)-cyclohexyl, 2'-tetrahydropyranyl; and
  $R_1$ is a member selected from the group consisting of hydrogen, methyl, ethyl, vinyl, ethynyl, chloroethynyl, bromoethynyl, 2-propynyl and 1,1,1-trifluoro-2-propynyl.

2. 6,6-ethylenetesterone cyclopenten-1-yl ether.
3. 6,6 - ethylenetestosterone-17-(2'-tetrahydropyranyl)-ether.
4. 6,6 - ethylenetestosterone-17-(1'-ethoxy)-cyclopentyl ether.
5. The method of preparing a 6,6-ethylenetestosterone of the formula:

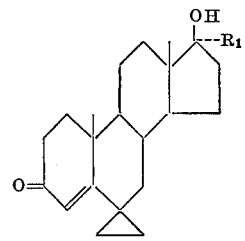

wherein $R_1$ is a member selected from the group consisting of hydrogen, methyl, vinyl, ethynyl, chloroethynyl, bromoethynyl, 2-propynyl and 1,1,1-trifluoro-2-propynyl which comprises reacting a compound of the formula:

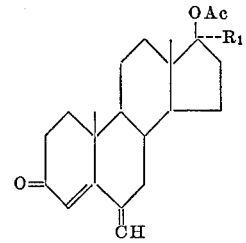

with trimethylsulfoxonium iodide in the presence of sodium hydride followed by hydrolysis of the corresponding 6,6-ethylenetestosterone acetate with an alkali metal hydroxide.

References Cited

Georgian et al., "Chemistry and Industry" (1962), page 1755 relied on.

HENRY A. FRENCH, Primary Examiner

U.S. Cl. X.R.

260—397.4, 397.5, 999

UNITED STATES PATENT OFFICE
CERTIFICATE OF CORRECTION

Patent No. 3,497,498　　　　　　　　　　　Dated February 24, 1970

Inventor(s) Vlasios Georgian

It is certified that error appears in the above-identified patent and that said Letters Patent are hereby corrected as shown below:

In claim 1, the structural formula,

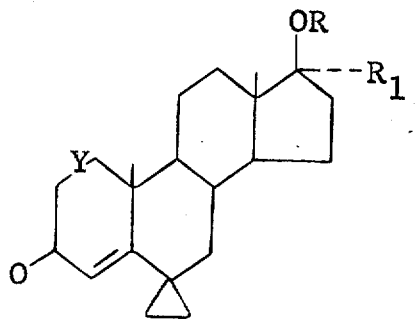　　　should read　　　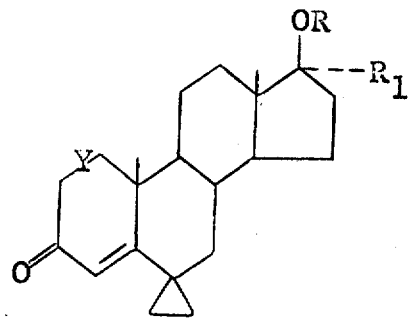

In claim 5, the second structural formula,

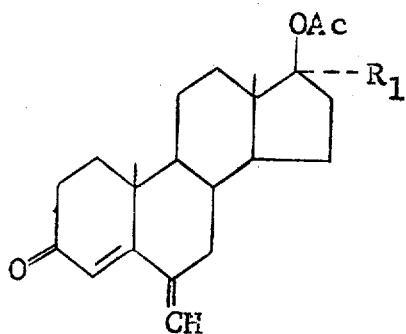　　　should read　　　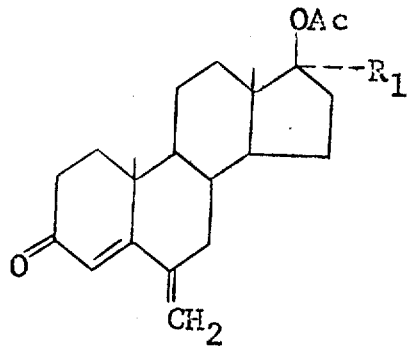

SIGNED AND SEALED

JUL 7 1970

(SEAL)
Attest:

Edward M. Fletcher, Jr.
Attesting Officer

WILLIAM E. SCHUYLER, JR.
Commissioner of Patents